2,731,277

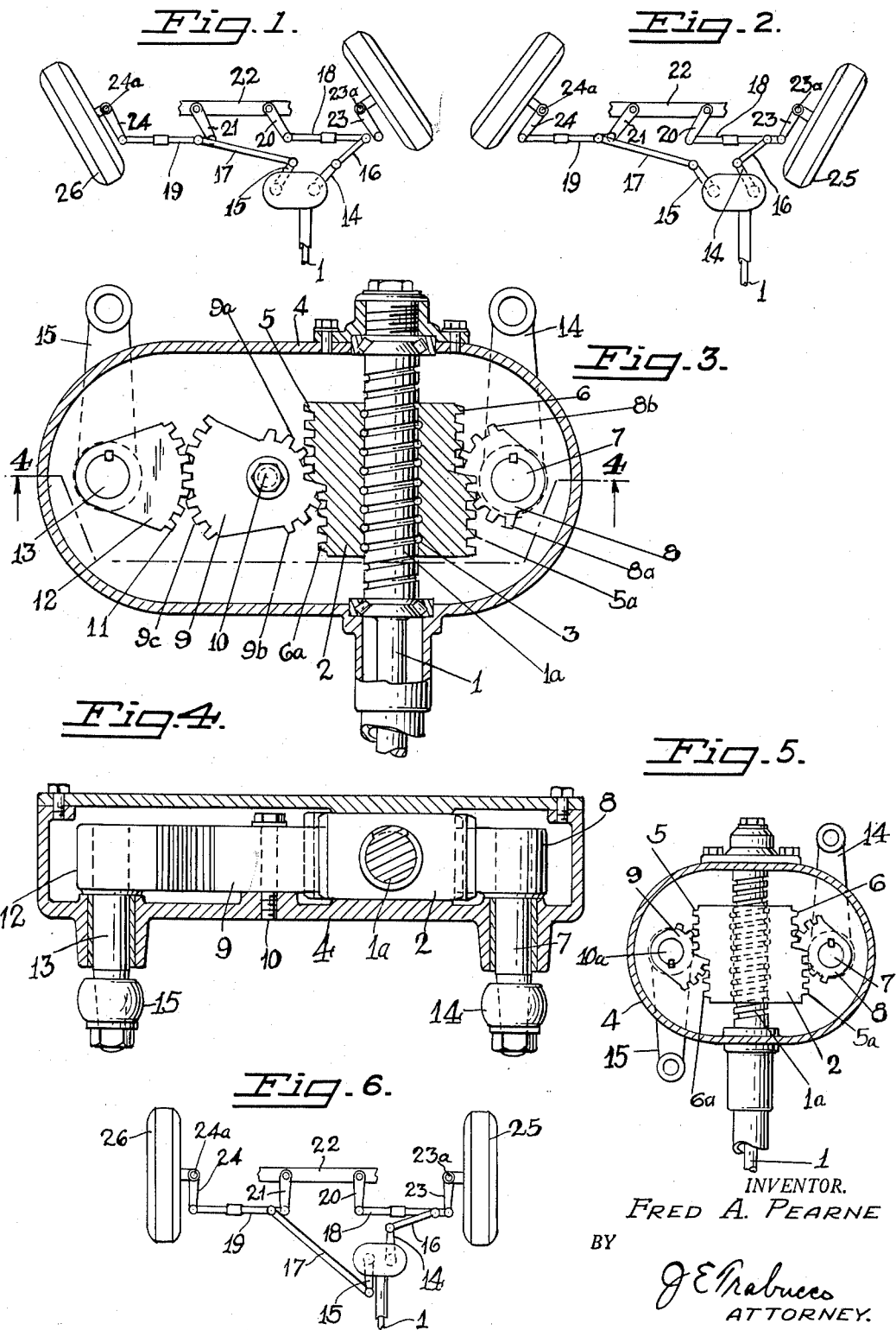
Jan. 17, 1956     F. A. PEARNE     2,731,277
DIFFERENTIAL STEERING MECHANISM
Filed June 20, 1955
INVENTOR.
FRED A. PEARNE
BY
J. E. Trabucco
ATTORNEY.

DIFFERENTIAL STEERING MECHANISM

Fred A. Pearne, Biggs, Calif.

Application June 20, 1955, Serial No. 516,500

2 Claims. (Cl. 280—93)

This invention relates to steering apparatus for motor vehicles.

To reduce slippage of the front wheels of a motor vehicle of the kind now in use when turning, it is desirable to have the inside wheel turn at a slower rate with respect to the outside wheel. Wear on the front tires and friction are thereby reduced.

The present invention provides an improved differential steering mechanism for motor vehicles, whereby, when making a turn, there is a differential movement with respect to the inner and outer front wheels, the pivotal movement about a vertical axis of the inside wheel being slower than such movement of the outside front wheel, while at the same time the proper radial alignment of the axes of the two wheels is maintained irrespective of the direction in which the vehicle is steered. In accomplishing these results, I provide a novel gear system which, upon being actuated by the turning of the steering wheel, imparts the aforesaid differential movement to the front wheels of the vehicle.

The primary object of the present invention is to provide a novel differential steering mechanism of the kind characterized, one which accelerates the pivotal movement of the outer front wheel with respect to the inside front wheel when turning, thereby avoiding side slippage of these wheels.

In the accompanying drawing:

Fig. 1 is a diagrammatic view showing the relative position of the two front wheels of a vehicle equipped with my differential steering mechanism, when making a left turn;

Fig. 2 is a similar view showing the relative positions of the front wheels when making a right turn;

Fig. 3 is a longitudinal sectional view taken through the housing which contains the differential gear system forming a part of my invention;

Fig. 4 is a sectional view taken on the line 4—4 of Fig. 3;

Fig. 5 is a sectional view showing a differential gear system embodying a modified form; and Fig. 6 is a diagrammatic view illustrating the steering mechanism which is associated with the gear system shown in Fig. 5.

Referring to the drawing, the numeral 1 designates a steering shaft which is connected in the usual manner to the steering wheel (not shown) of a motor vehicle. An end portion 1a of the steering shaft is provided with spiral grooves which are arranged in watching relationship with similar grooves provided in the sides of a longitudinal bore formed in a differential rack 2. A series of steel balls 3 positioned in the spiral grooves of the end portion 1a of the steering wheel and the differential rack, form a suitable connection between these elements for effecting the longitudinal movement of the rack along the said end portion when the steering shaft is turned. Thus when the steering shaft 1 is turned in one direction, the differential rack is moved longitudinally in one direction along the grooved end portion 1a, and when the steering shaft is turned in the opposite direction, the reverse movement of the rack is effected.

A suitable housing 4 encases the differential rack, the grooved end portion of the steering shaft and the differential gears associated with the rack. Suitable bearings provided in the opposite sides of the housing 4 engage with the steering shaft.

The differential rack 2 is provided at its opposite sides with four (4) sets of teeth, one end portion of such rack having an aligned set of teeth 5 at one side and another aligned set of teeth 6 at its opposite side, while the opposite end portion of the rack is provided with an aligned set of teeth 5a at one side and an aligned set of teeth 6a at its opposite side. The sets of teeth 5 and 5a are arranged farther from the longitudinal axis of the differential rack 2 than the sets of teeth 6 and 6a, and the sets of teeth 5 and 5a are arranged equal distances from such axis while the sets of teeth 6 and 6a are the same distance from the said axis. It will be noted that the set of teeth 5 at one end portion of the rack 2 is positioned in opposed relation to the set of teeth 6, while the set of teeth 6a carried on the other end portion of the rack is positioned in opposed relation to the set of teeth 5a. The sets of teeth 5 and 6 extend substantially along one-half (½) the length of the rack while the sets of teeth 5a and 6a extend along the remaining length of such rack.

Keyed to a stub shaft 7, which is mounted for pivotal movement about an axis substantially at right angles to the steering shaft and which has portions extending through the housing and externally thereof, is a differential gear 8 having adjoining sets of arcuately arranged teeth 8a and 8b, which are concentric with respect to the shaft 7 but are positioned at different distances therefrom. The set of arcuate teeth 8b are adapted to mesh with the teeth 6 of the rack while the teeth 8a are adapted to mesh with the teeth 5a of such rack.

At the opposite side of the rack 2 is a similar differential gear 9, which is mounted for pivotal movement about a pivot pin or member 10. The differential gear 9 is also provided at its inside edge with adjoining sets of arcuately arranged teeth 9a and 9b, which are concentric with the pivot member 10 but are positioned at different distances therefrom. The sets of arcuately arranged teeth 9a and 9b are adapted to mesh with the sets of teeth 5 and 6a, respectively, of the rack 2. The sets of teeth 9a and 9b of the differential gear 9 are positioned in the same relative positions with respect to the pivot member 10 as are the teeth 8a and 8b of the differential gear 8 with respect to their associated shaft 7. In other words, the radii of the arcs along which the teeth 8a and 9a are arranged are the same length while the radii of the arcs along with the teeth 8b and 9b are arranged are of the same length.

The opposite or outside edge of the differential gear 9 is provided with an arcuate row of teeth 9c, which mesh with similar teeth 11 carried on a segmental gear 12, the latter being keyed to a stub shaft 13 which has portions extending through the housing 4 and externally thereof. The radii of the arcs defined by the sets of arcuately arranged teeth 9c and 11 of the gears 9 and 12, respectively, are substantially the same.

Secured at ends thereof to the stub shafts 7 and 13, respectively, are arms 14 and 15 of substantially the same length. Pivotally connected to the opposite ends of the arms 14 and 15, respectively, are connecting links 16 and 17 of unequal length. It is to be noted that the connecting links 16 and 17 are of unequal length because the steering shaft 1 and the housing are positioned to the right of a center plane passing longitudinally through the vehicle, in accordance with the conventional position of the driver's seat. Should the steering wheel and shaft be centrally located with respect to the vehicle body, the connecting links 16 and 17 would be substantially the same length. While certain ends of the links 16 and 17 are connected to the arms 14 and 15, their opposite ends are pivotally connected to connecting rods 18 and 19, respectively. Idler arms 20 and 21 are pivotally connected at ends thereof to the connecting rods 18 and 19, respectively, and at their opposite ends to the frame or chassis 22 of the vehicle. The connecting rods 18 and 19 are pivotally connected, respectively, to angular spindle arms or spindles 23 and 24 on which left and right front wheels 25 and 26 are respectively mounted for pivotal adjustment about vertical axes 23a and 24a, respectively. It will be noted that the linkage between the arms 14, 15 and the right and left front wheels 25 and 26 may embody various forms, any of which are capable of pivoting the wheels to the right and left as the said arms are swung in opposite directions by turning the steering shaft 1 in the direction in which the front wheels are to turn pivotally.

In turning the steering wheel and the shaft 1, say, to the right to steer the vehicle in the same direction, the differential rack 2 is actuated toward the steering wheel and the teeth 5 and 6 thereof, engaging with the teeth 9a and 8b of the gears 9 and 8, respectively, turn these gears in clockwise and counter-clockwise directions, respectively, but at different rates of speed. The gear 8 is turned slower than the gear 9, and similarly the segmental gear 12 turns at the same rate of speed as the gear 9 but in a counter-clockwise direction. Thus the arms 14 and 15 are simultaneously swung to the left, but with the arm 14 swinging at a slower rate with respect to the movement of the arm 15. Thus through the linkage connecting the arms 14 and 15 with the spindles 23 and 24, respectively, on which the right and left front wheels 25 and 26 are respectively mounted, such wheels are pivotally turned about the vertical axes on which they are mounted at varying rates of speeds, with the front right wheel pivotally turning about its vertical axis at a slower rate of speed than the left front wheel. By turning the steering wheel and the shaft 1 in the opposite direction and to the left, the reverse movement takes place. When the steering wheel and steering shaft 1 are turned to the left sufficiently to move the differential rack 2 in a reverse direction away from the steering wheel to a point where the teeth 8a of the gear 8 and the teeth 9b of the gear 9 mesh with the teeth 5a and 6a, respectively, of the rack 2, the left front wheel 26 will be pivotally turned about a vertical axis at a slower rate than the right front wheel 25.

In the embodiment of my invention shown in Figs. 5 and 6, the segmental gear 12 has been eliminated, and the linkage connecting the gears 8 and 9 to the wheels 25 and 26 has been modified to effect the turning of the wheels about vertical axes in the same direction. In this embodiment the differential gear 9 is keyed to a stub shaft 10a, and secured to the latter is the arm 15. The arms 14 and 15 are positioned at an angle of approximately one hundred eighty (180) degrees from one another, with the arm 14 being positioned upwardly and the arm 15 downwardly (Fig. 6). The arms are adapted to swing simultaneously in opposite directions and not in the same direction. When the arms 14 and 15 are swung in counterclockwise and clockwise directions, respectively, upon the turning of the steering shaft to the right, the front wheels 25 and 26 are turned about their pivots 23a and 24a to the right, with the right wheel 25 turning at a slower rate of speed with respect to the left wheel 26. The reverse action occurs when the arms 14 and 15 are swung in clockwise and counter-clockwise directions, respectively.

It is to be understood that the sets of teeth on opposite sides of the differential rack may be positioned in oppositely arranged inclined formation with the sets of teeth on the differential gears so positioned that they progressively engage with the rack teeth as the rack is moved back and forth.

It is to be understood that the steering shaft and differential rack may have left hand threads instead of the right hand threads shown on the drawing, and in such an event the arms 14 and 15 are positioned rearwardly with the gear ratios reversed. Should the segmental gear 12 be positioned to the right of the steering shaft and the said shaft and rack have left hand threads, the steering arms 14 and 15 are positioned forwardly or in an upward position as shown on the drawing, and the gear ratios will be reversed.

In the event the segmental gear 12 is eliminated and the steering shaft and differential rack have left hand threads, the steering arms 14 and 15 are reversed as to the positions shown in Figs. 5 and 6, and the gear ratios are reversed. The gear ratios may be changed in accordance with different requirements.

What I claim is:

1. In a differential steering mechanism for automotive vehicles of the type having a pair of front wheels rotatably mounted on spindle arms which are arranged for pivotal movement about substantially vertical pivots, a steering shaft, an elongated differential rack mounted on and connected to the steering shaft and arranged for longitudinal movement in one direction on the shaft when the shaft is turned in one direction and in the reverse direction when the shaft is turned in the opposite direction, the said rack at one end portion having a set of longitudinally aligned teeth at one of its side edges and another set of longitudinally aligned teeth at its other side edge, one of such sets of teeth being arranged farther from the longitudinal axis of the rack than the other set of teeth, the said rack at its other end portion having similar sets of teeth adjoining but reversely arranged with respect to the first mentioned sets of teeth, a stub shaft mounted adjacent one side of the rack and arranged for pivotal movement about an axis at substantially right angles to the steering shaft, a differential gear secured to the stub shaft and having two adjoining sets of arcuately arranged peripheral teeth, one set being arranged along an arc having a substantially larger radius than the radius of the arc along which the other set of teeth are arranged, the particular set of gear teeth which are arranged along the arc having the larger radius being adapted to mesh with those teeth at one side edge of the rack which are closest to the axis of the rack and the particular set of gear teeth which are arranged along the arc having the smaller radius being adapted to mesh with those teeth at the last mentioned side edge of the rack which are farthest from the axis of the rack, a second similar differential gear pivotally mounted at the opposite side edge of the rack and having its sets of teeth arranged for engagement with the rack teeth on the said opposite side of the rack, the last mentioned differential gear having a third set of gear teeth, a segmental gear having its teeth engaging with the third set of gear teeth of the second differential gear, a stub shaft secured to the segmental gear, rigid arms secured to the stub shafts, and link means connecting the stub shafts to the spindle arms.

2. In a differential steering mechanism for automotive vehicles of the type having a pair of front wheels rotatably mounted on spindle arms which are arranged for pivotal movement about substantially vertical pivots, a steering shaft, an elongated differential rack mounted on and connected to the steering shaft and arranged for longitudinal movement in one direction on the shaft when the shaft is turned in one direction and in the reverse direction when the shaft is turned in the opposite direction, the said rack at one end portion having a set of longitudinally aligned teeth at one of its side edges and another set of longitudinally aligned teeth at its other side edge, one of such sets of teeth being arranged farther from the longitudinal axis of the rack than the other set, the said rack at its other end portion having similar sets of teeth adjoining but reversely arranged with respect to the first mentioned sets of teeth, a stub shaft mounted at one side of the rack and arranged for pivotal movement about an axis at substantially right angles to the steering shaft, a differential gear secured to the stub shaft and having two adjoining sets of arcuately arranged peripheral teeth, one set being arranged along an arc having a substantially larger radius than the radius of the arc along which the other set of teeth are arranged, the particular set of gear teeth which are arranged along the arc having the larger radius being adapted to mesh with those teeth at one side of the rack which are closest to the axis of the rack and the particular set of gear teeth which are arranged along the arc having the smaller radius being adapted to mesh with those teeth at the last mentioned side edge of the rack which are farthest from the axis of the rack, a second similar differential gear pivotally mounted at the opposite side of the rack and having its sets of teeth arranged for engagement with the rack teeth on the said opposite side of the rack, a second stub shaft secured to the second differential gear, rigid arms secured to the stub shafts, and link means connecting the stub shafts to the spindle arms.

References Cited in the file of this patent

UNITED STATES PATENTS

| | | |
|---|---|---|
| 1,026,146 | Bliss | May 14, 1912 |
| 1,880,390 | Hoffman | Oct. 4, 1932 |
| 1,908,008 | Bethenod | May 9, 1933 |

FOREIGN PATENTS

| | | |
|---|---|---|
| 131,967 | Great Britain | Sept. 5, 1919 |